(12) United States Patent
Boeing et al.

(10) Patent No.: US 8,176,806 B2
(45) Date of Patent: May 15, 2012

(54) TWO-AXLE DRIVE SYSTEM

(75) Inventors: Georg Boeing, Rottenburg (DE);
Wolfgang Schnurr, Nehren (DE); Jens Kunert, Tuebingen (DE)

(73) Assignee: Siemens Aktiengesellschaft, München (DE)

( * ) Notice: Subject to any disclaimer, the term of this patent is extended or adjusted under 35 U.S.C. 154(b) by 514 days.

(21) Appl. No.: 12/301,816

(22) PCT Filed: May 15, 2007

(86) PCT No.: PCT/EP2007/004290
§ 371 (c)(1),
(2), (4) Date: Nov. 21, 2008

(87) PCT Pub. No.: WO2007/134752
PCT Pub. Date: Nov. 29, 2007

(65) Prior Publication Data
US 2010/0229678 A1  Sep. 16, 2010

(30) Foreign Application Priority Data
May 24, 2006 (DE) .......................... 10 2006 024 867

(51) Int. Cl.
*F16H 1/16* (2006.01)
*F16H 55/08* (2006.01)
*F16H 1/20* (2006.01)
*F24J 2/38* (2006.01)

(52) U.S. Cl. ........... 74/425; 74/412 R; 74/416; 126/576; 126/605; 126/607

(58) Field of Classification Search ............... 74/412 R, 74/416, 417, 423, 425, 457, 458, 459.5; 126/576, 126/577, 605, 606, 607; 248/292.12
See application file for complete search history.

(56) References Cited

U.S. PATENT DOCUMENTS

| | | | |
|---|---|---|---|
| 4,145,021 A * | 3/1979 | Gaechter et al. | 248/371 |
| 4,383,520 A | 5/1983 | Huebl et al. | |
| 4,574,659 A | 3/1986 | Arndt | |
| 4,843,904 A * | 7/1989 | Moore | 74/396 |
| 5,251,505 A * | 10/1993 | Castellani | 74/392 |
| 6,617,506 B2 * | 9/2003 | Sasaki | 136/246 |
| 7,159,831 B2 * | 1/2007 | Gartner et al. | 248/274.1 |
| 2006/0005651 A1 * | 1/2006 | Laforest | 74/425 |

FOREIGN PATENT DOCUMENTS

| | | |
|---|---|---|
| DE | 1 053 269 | 3/1959 |
| DE | 29 30 052 | 2/1981 |
| EP | 0 045 463 | 2/1982 |
| WO | 88/04016 | 6/1988 |

* cited by examiner

*Primary Examiner* — Justin Krause
*Assistant Examiner* — Adam D Rogers
(74) *Attorney, Agent, or Firm* — Henry M. Feiereisen; Ursula B. Day

(57) ABSTRACT

In a two-axle drive system (10) for holding and moving large sunlight-absorbing, concentrating or reflecting surfaces about an azimuth axis (14) and an elevation axis (15), in the case of which a first gear unit which is driven by a first drive (43) is provided for a rotational movement about the azimuth axis (14), and a second gear unit which is driven by a second drive (45) is provided for a rotational movement about the elevation axis (15), the first gear unit being located in a first housing section (23), and the second gear unit being located in a second housing section (24), the first and second housing sections (23, 24) are immobile relative to each other. High stiffness is obtained as a result.

7 Claims, 3 Drawing Sheets

TWO-AXLE DRIVE SYSTEM

The present invention relates to a two-axle drive system for holding and moving large sunlight-absorbing, concentrating or reflecting surfaces about an azimuth axis and an elevation axis, in the case of which a first gear unit which is driven by a first drive is provided for a rotational movement about the azimuth axis, and a second gear unit which is driven by a second drive is provided for a rotational movement about the elevation axis, the first gear unit being located in a first housing section, and the second gear unit being located in a second housing section.

Solar power plants operate according to different principles. Examples include parabolic trough power plants, tower power plants, and photovoltaic power plants. In all of these power plants, it is necessary to move large surfaces, e.g., large mirror surfaces, photovoltaic modules, Fresnel modules, etc. These surfaces must track the position of the sun with high accuracy, since even the slightest deviations in position result in poorer efficiency. In particular, the surfaces must be oriented with an accuracy of <1 mrad. Due to the large surfaces, e.g., in the range of 120 m$^2$, the drives must also have great stability and stiffness against wind forces, since wind forces may result in a very slight deviation in position.

In known two-axle drive systems, the gear units are located in different housing parts which are rotatable relative to each other. The stiffness and stability are negatively affected by this rotatabilty, since it results in additional play.

The object of the present invention is to provide a two-axle drive system that fulfills the requirements mentioned above.

This object is attained in a surprising and simple manner using a two-axle drive system of the type described initially, in the case of which the first and second housing sections are immobile relative to each other.

Due to these measures, the first and second housing sections are rigidly situated relatively to each other. This results in greater stiffness than is present in the prior art. It is feasible for the first and second housing sections to be fixedly connected to each other, e.g., via a threaded connection or welding. The rigid placement of the housing sections relative to each other also makes it possible to increase positional accuracy. Greater efficiency in terms of energy yield may be attained as a result.

In a preferred embodiment, the two gear units are advantageously located in the same, one-pieced housing. In the context of the present invention, a one-pieced housing is also understood to be a housing that includes installation covers which are screwed onto installation openings, e.g., onto installation openings for the gear unit. The housing structure may therefore be designed for maximum stiffness, since a parting line is not produced between the housing sections. This results in better precision and has a positive effect on the overload capability and costs of the housing.

The one-pieced housing may be realized in a particularly simple manner when it is designed as a cast piece.

In a preferred embodiment, it may be provided that the entire housing is situated in a rotatable manner. The rigid configuration within a single housing is made possible as a result. Both of the gear units or parts of the two gear units are moved together about the azimuth axis.

Advantageously, each gear unit includes a worm output stage. Particularly high accuracy, i.e., an exact orientation of the surfaces, may be attained as a result.

In a particularly preferred embodiment of the present invention, it may be provided that each gear unit includes a worm output stage and an upstream worm gear stage, thereby resulting in self-locking. Due to the self-locking, a specified position may be maintained exactly. The position may be maintained without the need for additional braking. Both of the gear stages are preferably integrated in the housing. This lowers the costs of assembly and manufacture.

In one embodiment of the present invention, it may be provided that the worm shaft of the worm output stage is located below the assigned worm wheel to enable rotational motion about the elevation axis. As a result, the weight of the installed parts (e.g., mirror surface) acts to continually reduce the circumferential backlash between the worm wheel and the worm shaft.

In one embodiment, the worm shaft of the worm output stage may be located on the side of the azimuth axis facing away from the elevation swivel range to enable rotational motion about the azimuth axis. As a result of this configuration, the weight of the surface acts to reduce the circumferential backlash between the worm wheel and the worm shaft of the gear unit for a rotational motion about the azimuth axis. Due to the one-pieced housing, the positions of the worm shafts are always fixed relative to each other. The worm shafts are situated in a stationary manner in the housing. Due to the configuration described above, the effect of the external loads on the worm shafts may be influenced and utilized in a positive manner.

When drive interfaces are provided in order to position the drives, it is possible to easily install standard drives, in particular standard gear unit motors with a defined interface, on the housing, in particular via a flange-mounting. It is therefore possible to connect drives having different dimensions to the housing as necessary.

Since the surfaces moved by the two-axle drive system are exposed to considerable wind forces at times, it is advantageous when at least one overload safeguard is provided, in order to prevent destruction of or damage to the two-axle drive system.

For example, the worm wheel of the worm output stage may include a support for the housing to enable rotational motion about the azimuth axis, the support being separated from the housing by a gap during normal operation, and against which the housing may bear when overload occurs. The system is designed for normal loads, i.e., for operation up to a certain wind force. The gap is present during normal operation (under normal loads). If gusts or storms occur, the two-axle drive system may become deformed or twisted, thereby resulting in the gap disappearing and support taking place.

An alternative or additional overload safeguard occurs when the housing includes a support for the worm wheel of the worm output stage to enable rotational motion about the elevation axis, the support being separated from the worm wheel by a gap during normal operation, and against which the worm wheel may bear when overload occurs.

If the worm shafts of the worm output stages include duplex teeth or conical spur gear toothing, the tooth flank play may be adjusted. As a result, precision may be increased and the play in the gear unit may be reduced.

The one-pieced housing also has the advantage that it may be designed such that all spaces are interconnected. A single interior space therefore results. All gear stages may be supplied with a lubricant. This makes it easy to change the oil and makes it easier to monitor the oil level, thereby reducing maintenance effort.

Further features and advantages of the present invention result from the detailed description of embodiments of the invention presented below with reference to the figures in the drawing which shows the details that are essential to the present invention. Further features and advantages of the present invention also result from the claims. The individual features may be realized individually, or they may be combined in any possible manner in different variations of the present invention.

Embodiments of the present invention are depicted in the schematic drawing and are described in greater detail in the description below.

Figure 1:
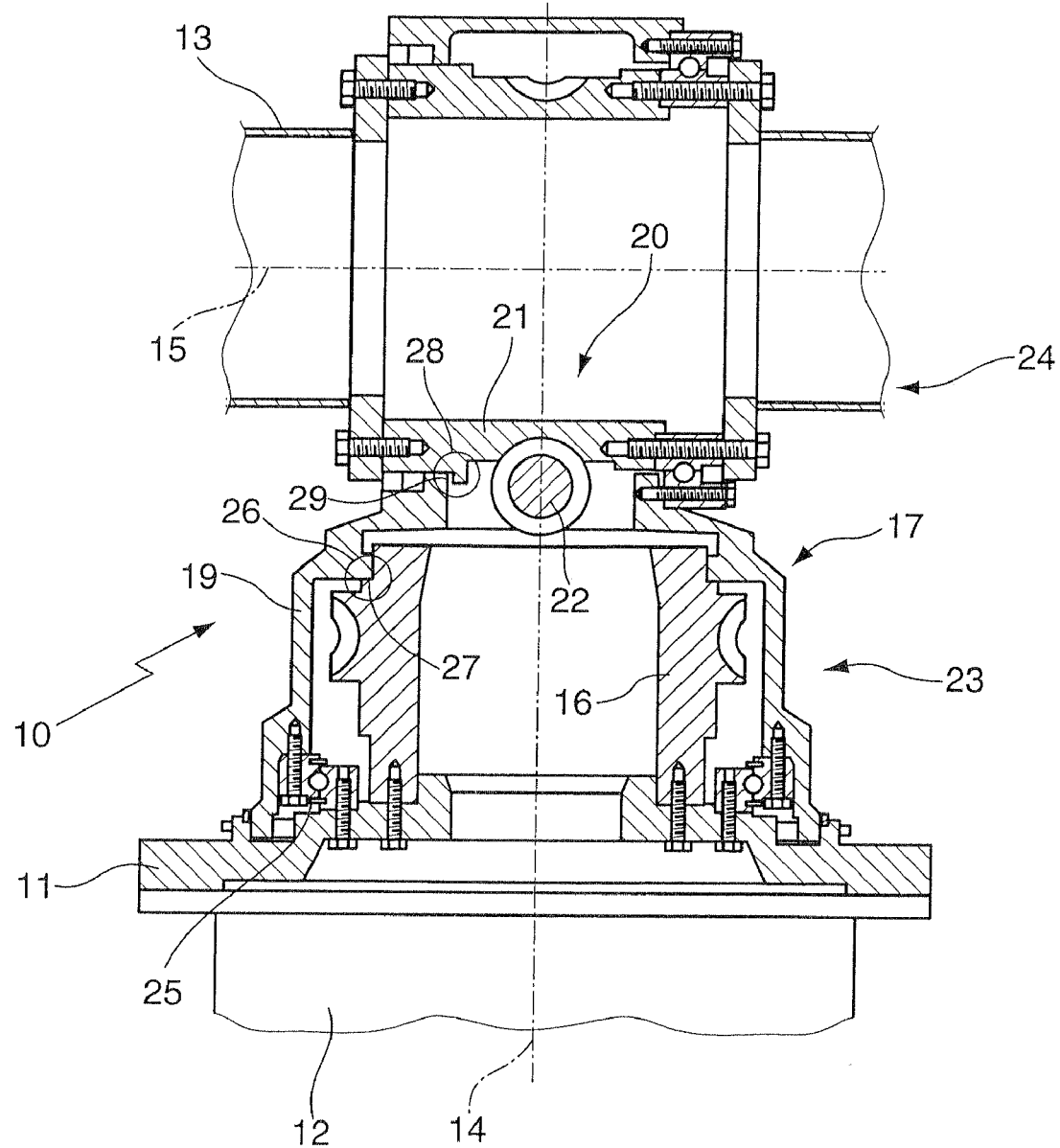
FIG. 1 shows a sectional view of a two-axle drive system according to the present invention.
Figure 2:
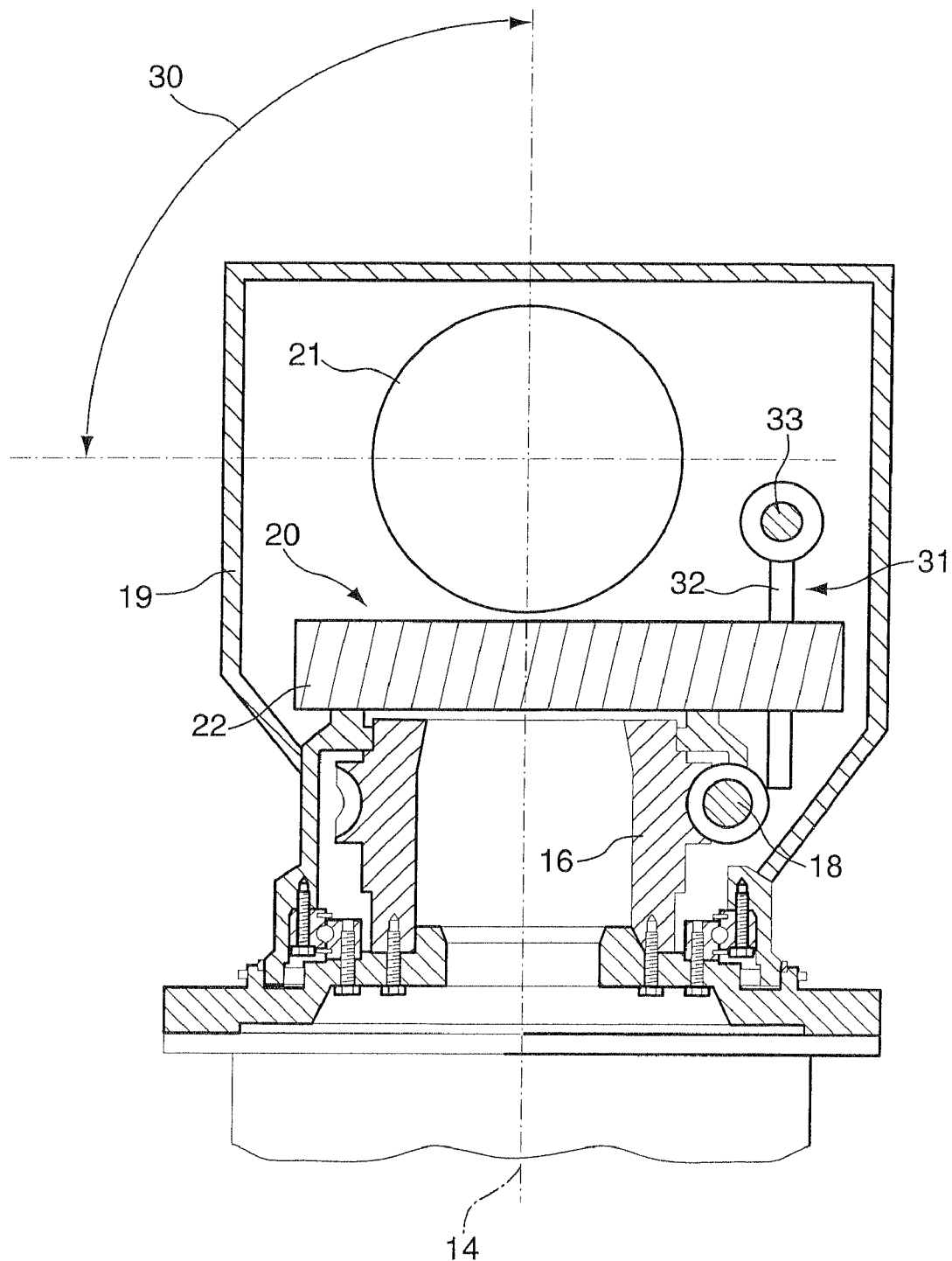
FIG. 2 shows a sectional view of the two-axle drive system rotated by 90°.

A sectional view of a two-axle drive system 10 is shown in FIG. 1. The two-axle drive system includes a fastening flange 11, via which the two-axle drive system may be fastened to a base 12. A surface which is not depicted but which may be fastened to shaft 13 may be rotated by two-axle drive system 10 about an azimuth axis 14 and about an elevation axis 15. A worm wheel 16 of a worm output stage 17 is rotatably located on fastening flange 11. By driving a worm shaft 18 which is shown in FIG. 2 and is situated in a stationary manner in a housing 19, it is possible to rotate housing 19 about azimuth axis 14.

A worm output stage 20 which includes a worm wheel 21 and a worm shaft 22 is also provided in housing 19. By driving worm shaft 22, it is possible to move worm wheel 21 and, therefore, shaft 13 fastened thereon. This enables rotation about elevation axis 15 to be achieved. Worm output stage 20 is also located in housing 19 which is one-pieced in design. The worm output stages are located one above the other in different housing sections 23, 24.

A rotational connection 25 is provided between housing 19 and fastening flange 11. This connection is highly precise in order to prevent play.

An overload safeguard is realized in region 26, and worm wheel 16 includes a support 27 for housing 19. During normal operation, support 27 and housing 19 are separated by a gap which is not shown in the drawing. If extreme forces occur, housing 19 may move onto support 27 and bear against it.

A further overload safeguard is realized in region 28; worm wheel 21 may bear against housing 19 when overload occurs. For this purpose, housing 19 includes a support 29 which, during normal operation, is separated from worm wheel 21 by a gap.

The sectional view shown in FIG. 2 shows clearly that worm shaft 22 is located beneath worm wheel 21. The weight of a surface which is swivelable in elevation swivel range 30 thereby presses worm wheel 21 in the direction of worm shaft 22, thereby minimizing play.

Worm output stage 20 is located downstream of worm gear stage 31 which includes a worm wheel 32 which interacts with worm shaft 22, and a driven worm shaft 33. A self-locking gear unit is realized via worm output stage 20 and worm gear stage 31. A further worm gear stage (not illustrated) similar to worm gear stage 31 is also located upstream of worm shaft 18. A worm output stage 17 and a worm gear stage are therefore also connected one behind the other inside housing 19. The gear units formed by the worm stages are self-locking.

It should also be noted that worm shaft 18 is located on the side of elevation swivel range 30 facing away from azimuth axis 14. Worm shaft 18 is pressed in the direction of worm wheel 16 by the weight of a surface to be moved. Stiffness is increased and play is reduced by this measure as well.

Figure 3:
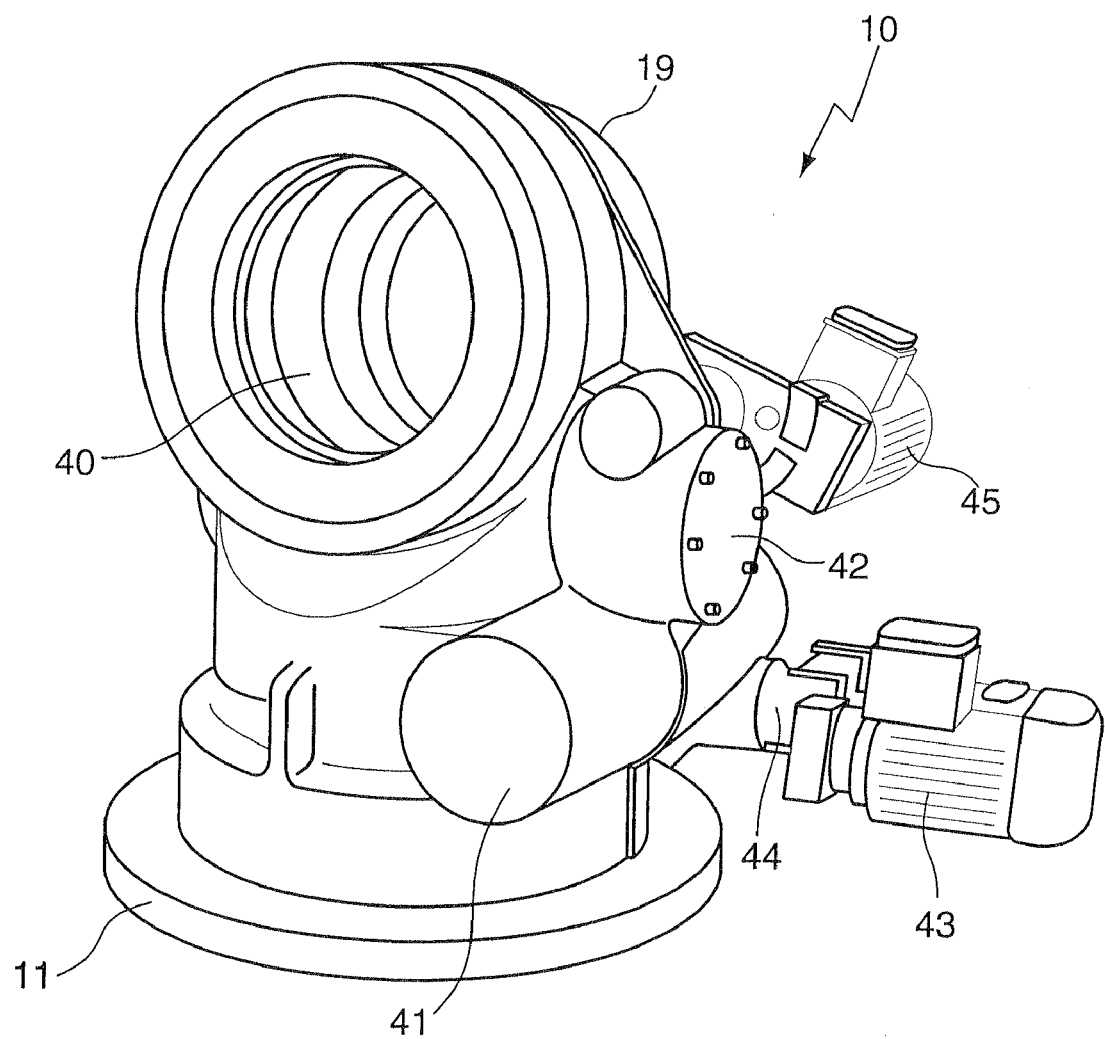
FIG. 3 shows a perspective view of the housing.

Housing 19 of two-axle drive system 10 is shown in FIG. 3. Shaft 13 may be installed in opening 40. It is also shown that housing 19 is designed as one piece. Only installation covers 41, 42 are screwed in place. Drive 43 which is flange-mounted on a drive interface 44 drives a worm shaft of a first worm gear stage. In turn, this worm gear stage drives worm shaft 18. As a result, housing 19 may be rotated about azimuth axis 14. Drive 45 is also connected to a drive interface. It drives shaft 33. Via drive 45, it is therefore possible to realize a rotational movement about elevation axis 15. Fastening flange 11 is also shown.

What is claimed is:

1. A two-axle drive system for holding and moving large sunlight-absorbing, concentrating or reflecting surfaces about an azimuth axis and an elevation axis, comprising:
    a one-piece housing having a first housing section and a second housing section, said one-piece housing configured for rotation relative to a fastening flange,
    a first gear unit located in the first housing section for rotational movement about the azimuth axis, said first gear unit comprising a first worm wheel fastened to the fastening flange attached to a base and a first worm shaft driven by a first drive, and
    a second gear unit located in the second housing section for rotational movement about the elevation axis, said second gear unit comprising a second worm wheel fastened to a shaft rotatably supported in the second housing section and coaxial with the elevation axis and a second worm shaft driven by a second drive,
    wherein the second worm shaft is arranged in the one-piece housing centrally beneath the second worm wheel so as to intersect the azimuth axis, with a weight of parts supported by the shaft pressing the second worm wheel in a direction of the second worm shaft, thereby minimizing play between the second worm wheel and the second worm shaft.

2. The two-axle drive unit as recited in claim 1, wherein the one-piece housing is a cast piece.

3. The two-axle drive system as recited in claim 1, wherein the first worm shaft is located on a side of the azimuth axis facing away from an elevation swivel range to enable rotational motion about the azimuth axis.

4. The two-axle drive system as recited in claim 1, wherein drive interfaces are provided for positioning the drives.

5. The two-axle drive system as recited in claim 1, wherein at least one overload safeguard is provided.

6. The two-axle drive system as recited in claim 1, wherein the first worm wheel includes a support for the one-piece housing to enable rotational motion about the azimuth axis, the support being separated from the housing by a gap during normal operation, and against which the one-piece housing may bear when overload occurs.

7. The two-axle drive system as recited in claim 1, wherein the one-piece housing includes a support for the second worm wheel, the support being separated from the second worm wheel by a gap during normal operation, and against which the second worm wheel may bear when overload occurs.

* * * * *